United States Patent [19]
Simpkins

[11] 3,749,831
[45] July 31, 1973

[54] TELEVISION MULTIPLEXING SYSTEM

[75] Inventor: Lorenz G. Simpkins, Merritt Island, Fla.

[73] Assignee: The United States of America as represented by the Administrator of the National Aeronautics and Space Administration

[22] Filed: May 5, 1972

[21] Appl. No.: 250,766

[52] U.S. Cl...... 178/6.8, 178/6.6 DD, 178/DIG. 23, 179/15 BS
[51] Int. Cl. .............................................. H04n 7/08
[58] Field of Search...................... 178/6.8, DIG. 23, 178/6.6 DD; 179/15 BS

[56] References Cited
UNITED STATES PATENTS 3,582,542 6/1971 Smierciak ........................... 178/6.8
3,647,949 3/1972 Closs........................... 178/DIG. 23

*Primary Examiner*—Howard W. Britton
*Attorney*—James O. Harrell, John R. Manning et al.

[57] ABSTRACT

A television multiplexing system which includes a circuit that inserts a digital coded sync signal and a digital code into a video signal for identifying the channel from which the video signal was generated so that a plurality of signals can be sent over a single hard-line. The digital sync signal and the digital coded signals are generated by a single crystal controlled clock so that they are always in synchronism with each other. In demultiplexing the signals so as to feed the video signal to a proper recording channel the sync signals are utilized for shifting the digital coded signals into a shift register and the shift register, in turn, activates a decoder according to the code stored in the shift register for selecting the proper recording disc or receiver for storing the video signal.

6 Claims, 6 Drawing Figures

TELEVISION MULTIPLEXING SYSTEM

Figure 1:
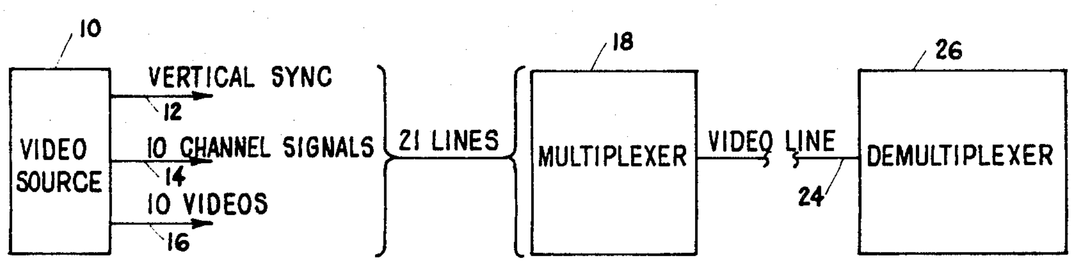

This invention described herein was made by an employee of the United States Government, and may be manufactured and used by or for The Government for Governmental purposes without the payment of any royalties thereon or therefor.

The invention relates to a television multiplexer and demultiplexing system, and more particularly to a system which inserts a coded digital sync signal and a digital code into a video signal identifying the channel from which the video signal was generated.

In monitoring the operation of space vehicles prior to launch and other complicated systems similar thereto, there may be thousands of parameters that require constant observation by engineers checking the system out. Presently the various parameters are fed to a digital display generator which produces video pictures illustrating the various parameters in real time. These pictures are stored on particular drum memories and the engineer who is normally at a remote location can activate the drum memory so as to call up the information stored thereon. These video signals are then transmitted over a hard-line to a receiving station for display. Normally, each of the digital display generators have the capability of storing ten different television displays. The problem is to transmit these ten or more television data displays over hard-lines for a substantial distance from the display generators. Less than ten lines are normally available for such use and the cost of adding new lines is expensive. More real time checkout information was needed to assure missile equipment reliability and thus, often more digital displays were needed. In order to overcome the problem of transmitting the video displays over a limited number of hard-lines it became evident that if these video signals were coded indicating the particular channel from which it was transmitted, then the video signals could be transmitted randomly and decoded at the receiving end to be channeled to the proper receiver.

In accordance with the present invention, it has been found that difficulties encountered in monitoring large numbers of parameters may be overcome by providing a novel multiplexing and demultiplexing system. The system for multiplexing video signals with identifying digital signals so as to identify the video channel from which a particular video signal is generated includes the following basic parts: (1) A video source having a plurality of channels containing video signals, (2) means provided by the video source for generating a channel signal for identifying each of the channels, (3) means provided by the video source for generating a vertical sync signal, (4) a multiplexing system including a timing circuit and a coding circuit for the video signals of each of the channels, (5) the timing circuit includes means activated by the vertical sync signal for generating code synchronization pulses and means for generating shifting pulses synchronized with the code synchronization pulses, (6) a coding circuit including a code generator for generating a digital code identifying a particular channel and a shift register coupled to the code generator, (7) means coupling the channel signal to the code generator causing the digital code to be shifted into the shift register, (8) a multiplexing circuit for combining the video signals with the code synchronization pulses and the digital code so as to produce a video signal having identifying digital coded signals and code synchronization pulses inserted therein, (9) a de-multiplexing system including means for receiving the video signals with the digital coded signal and code synchronization pulses inserted therein, (10) a plurality of recording means for recording the video signals, and (11) means for removing the code synchronization pulses and the digital coded signals from the received video signals and utilizing the code synchronization signals for loading the digital coded signal into a shift register which is, in turn, coupled to a decoder for selecting the desired recorder for the particular video signal received.

Accordingly, it is an important object of the present invention to provide a system for transmitting large numbers of video signals over a single hard-line and at the receiving end identifying the particular channel from which the video signal originated.

Another important object of the present invention is to provide a multiplexing system for video signals which inserts a digital coded signal and a digital sync signal in the blanking portion of a video signal for identifying a particular channel from which the video signal derived.

Still another important object of the present invention is to provide a system which generates video signals that have a digital coded sync signal and a digital code identifying the channel from which the video signal was derived that are always in sync with each other since they are derived from a single crystal controlled clock.

Figure 2:
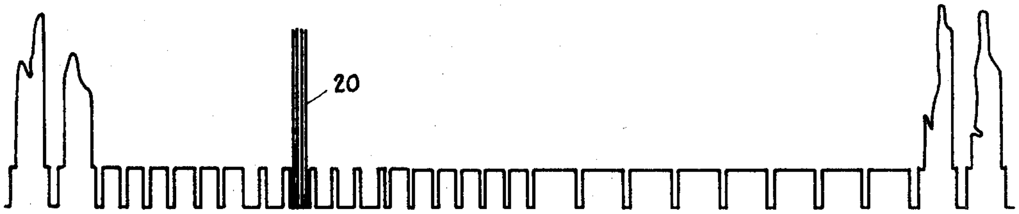
Figure 2A:
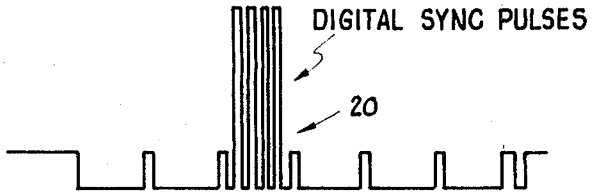
Figure 2B:
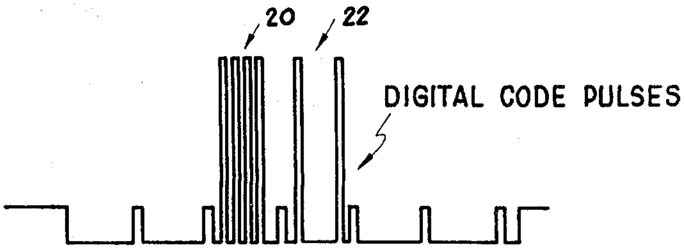
Figure 3:
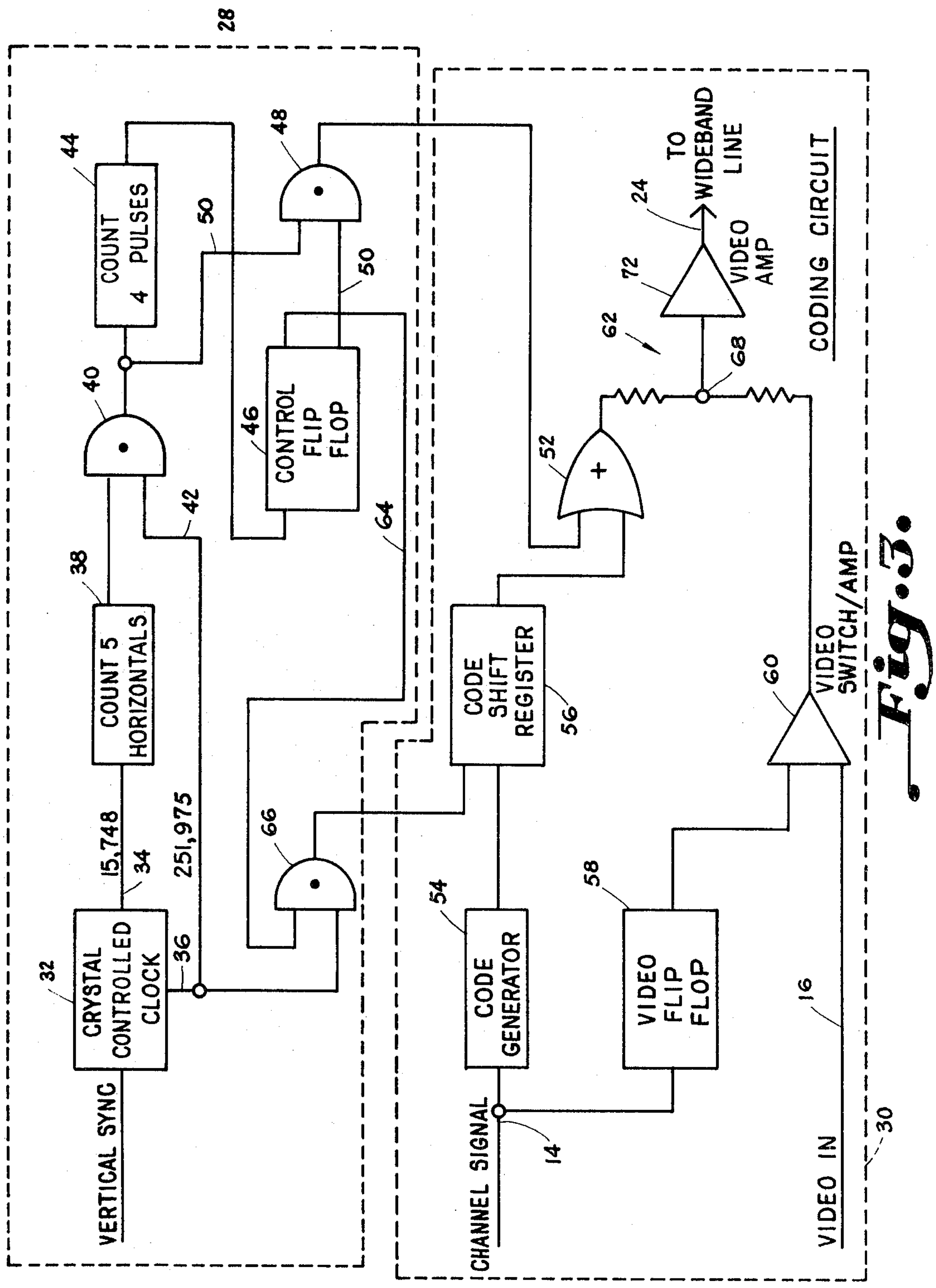
Figure 4:
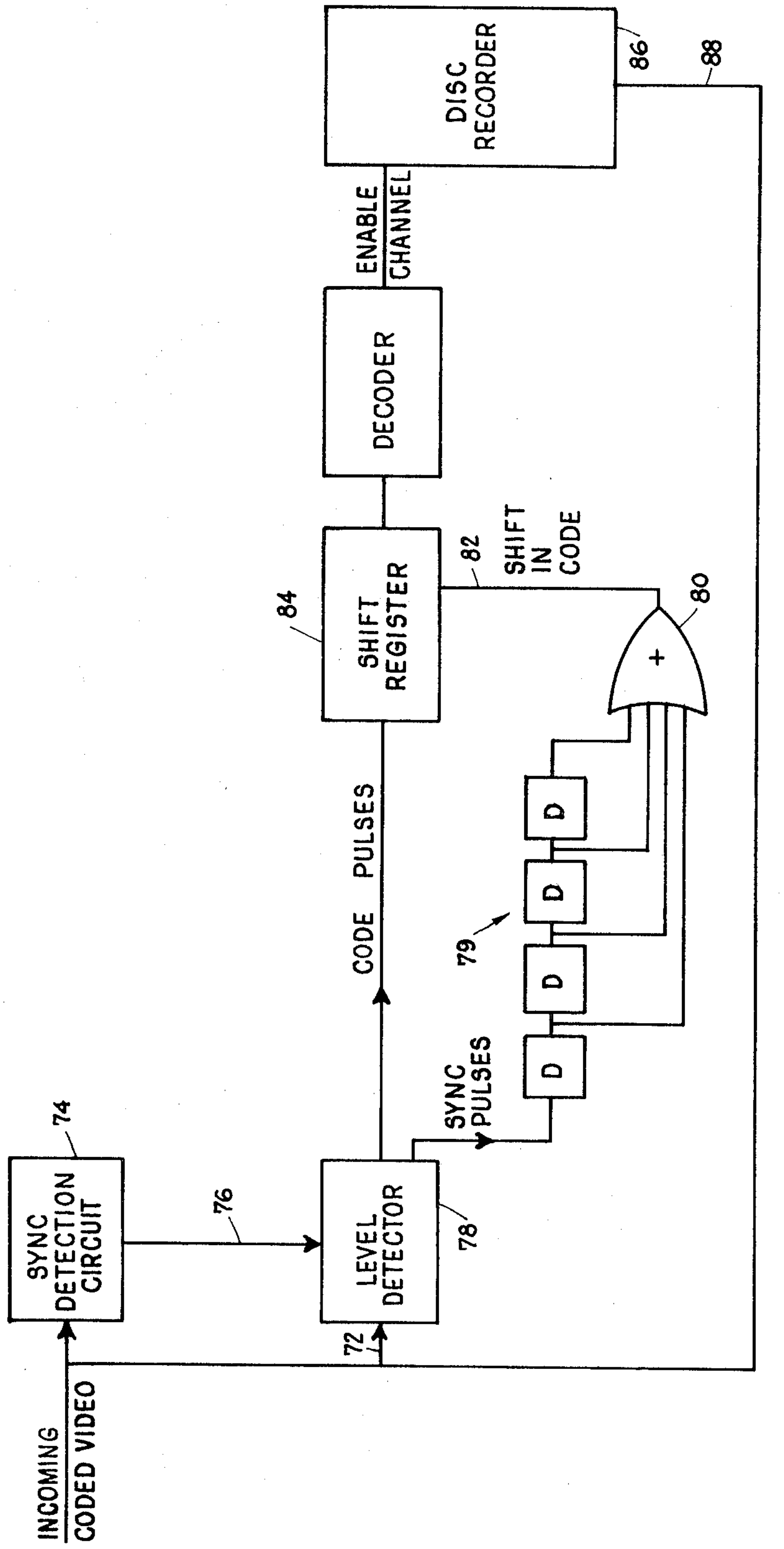

Other objects and advantages of this invention will become more apparent from a reading of the following detailed description and appended claims, taken in conjunction with the accompanying drawings wherein:

FIG. 1 is a block diagram illustrating the overall system constructed in accordance with the present invention, FIGS. 2, 2A and 2B illustrate a video signal enlarged for purpose of showing the code sync signal and a digital code inserted therein, FIG. 3 is a more detailed block diagram of the multiplexing portion of the system, and FIG. 4 is a more detailed diagram of the demultiplexing portion of the system.

Referring in more detail to FIG. 1, there is illustrated in block diagram form a television multiplexing system constructed in accordance with the present invention. The system includes a video source 10 which collects information from a large number of parameters located at a test site and converts the parameters into real time and records such on a plurality of video channels. In the particular video source 10 illustrated there are 10 video channels which have selected information stored thereon in a conventional composite 525 line television video signal. Provided at the output of the video source 10 are three signals; a vertical sync signal provided on output line 12, channel identification signals provided on the ten output lines 14, and ten separate video signals provided on the ten output lines 16. The three signals appearing on the twenty-one output lines coming out of the video source 10 are, in turn, fed to a multiplexer 18. The multiplexer 18, inserts a plurality of code synchronization pulses 20 and a digital code 22 into the composite video signal. The composite video signal with the digital sync signal 20 and the digital code 22 inserted therein is then transmitted over a single hard-line 24 to a remote station that has included therein a demultiplexing system 26 which, in turn, removes the digital sync signal 20 and the digital code 22 from the composite video signal and allows such to be recorded on a particular disc recorder represented by the digital code carried in the transmitted video signal.

Referring in more detail to FIG. 3, there is illustrated a video multiplexing circuit. The multiplexing circuit includes a single timing circuit shown enclosed in dotted lines 28 and ten separate coding circuits, one of which is shown in dotted lines 30. As shown in FIG. 3, the timing circuit 28 is illustrated at the top and the coding circuit 30 is illustrated at the bottom. When a particular video signal coming off of one of the ten video lines 16 is to be multiplexed with code sync pulses and identifying digital codes the vertical blanking signal coming out of the video source on line 12 is fed to a crystal controlled clock 32 which produces two output signals on lines 34 and 36, respectively. The output on lead 34 is 15,748 cycles per second, whereas, the output on lead 36 is 251,975 cycles per second.

As previously mentioned, when the vertical blanking portion of the composite signal is sensed the crystal control clock 32 begins counting. A counter 38 coupled to the output 34 counts the first five pulses produced by the crystal controlled clock 35 and then sends a signal to AND gate 40 enabling the AND gate. This allows the output pulses having a frequency of 251,975 coming in on lead 42 of AND gate 40 to pass therethrough. Connected to the output of AND gate 40 is a counter 44 which counts the first four pulses coming through gate 40 and generates a signal which is, in turn, fed to a control flip-flop 46. This, in turn, causes the control flip-flop 46 to disenable an AND gate 48 coupled to output lead 50 from flip-flop 46. Prior to AND gate 48 becoming disabled the four pulses coming out of AND gate 40 are fed over line 50, through AND gate 48 to an OR gate 52. The four pulses make up the digital sync signal 20 which is to be inserted into the video signal being transmitted.

Referring now to the coding circuit 30, when a particular channel in the video source 10 is updated a signal is generated on one of the ten output leads 14 indicating the particular channel that was updated. This signal is fed over one of the leads 14 to a particular one of the ten coding circuits 30. The information coming in on lead 14 activates a particular code generator 54 which generates a BCD coded binary signal which identifies the particular channel from which the video signal was generated. This BCD coded binary signal is then fed into a code shift register 56. The channel signal coming in on line 14 is also fed to a video flip-flop 58 which has its output coupled to a video switch amplifier 60. The video signal coming in on line 16 from the video source 10 is supplied to another input of the video switch amplifier 60. When the channel signal activates a video flip-flop 58 the video signal is allowed to pass through the video switch 60 to a multiplexing circuit which includes a resistive network 62 coupled between the output of the OR gate 52 and the output of the video switch 60. The resistive network 62 is provided for algebraically adding the digital sync pulses 20 and the digital code 22 to the composite video signal. The manner in which the digital sync pulses 20 are generated have already been described and are illustrated in FIGS. 2 and 2A.

As previously mentioned, the digital code 22 generated by the code generator 54 has been loaded into the shift register 56. After the control flip-flop 46 has disabled the AND GATE 48 a signal is generated on its output terminal 64 and fed to an input of AND gate 66 enabling AND gate 66. Connected to another input of AND gate 66 is the output of the crystal controlled clock 32 which has thereon, the 251,975 frequency signal. These pulses are fed through the AND gate 66 to shift the digital code out of the code shift register 56 through the OR gate 52 to be added algebraically with the video signal at junction 68. As can be seen from FIG. 2B the first four pulses generated by the timing circuit are utilized as digital sync pulses 20 and the next pulses are a BCD coded binary signal. Since both of these groups of pulses 20 and 22 are generated by the same crystal control clock 32, they are always in synchronism with each other.

Referring to FIG. 4, there is illustrated the demultiplexing circuit. The incoming signal which is transmitted over the wide band line 70 after being amplified by the amplifier 72 is fed into a sync detection circuit 74 that generates a signal when the vertical sync is detected. This signal is sent over lead 76 to enable a level detector 78. At an input terminal 72 of the level detector 78 is the incoming video signal and the level detector 78 strips out the digital sync pulses 20 and the digital code 22. The digital sync pulses 20 are always present for maintaining the multiplexing circuit in synchronism. The digital sync pulses 20 are then fed through a delay network 79 which delays the four pulses that make up the digital sync pulses 20 so that they will coincide with the digital code pulses 22. The delayed digital sync pulses 22 are then fed through an OR gate 80 to a shifting input 82 of a shift register 84. Connected to the input of the shift register 84 are the digital code pulses 22. The delayed digital sync pulses 20 then shift the digital code pulses 22 into the shift register 84. Connected to the output of the shift register 84 is a decoder which decodes the information stored in the shift register 84 and selects the desired channel on a disc recorder 86 according to the code that was inserted by the video signal. The incoming video signal is fed by means of lead 88 which is coupled to the wide band line 70 to the desired channel in the video disc recorder 86.

In summarizing the operation of the television video circuit, by inserting a digital sync pulse 20 and a digital code 22 into the blanking portion of a video signal, many signals coming from different channels can be transmitted over a single wide band line and separated by a demultiplexing system according to the digital code contained therein. By utilizing a single crystal control clock 32 for generating both the digital sync pulses 20 and the digital code 22 the system remains in sync at all times, and it is only necessary to strip the sync pulses 20 and the coded pulses 22 from the composite video signal and feed such to a decoder which selects the proper disc recorder for recording the video signal.

While a preferred embodiment of the invention has been described using specific terms, such description is for illustrative purposes only, and it is to be understood that changes and variations may be made without departing from the spirit or scope of the following claims.

I claim:

1. A system for multiplexing video signals with identifying digital signals so as to identify the video channel from which a particular video signal is generated;

A. a video source having a plurality of channels containing video signals;

B. means provided by said video source for generating a channel signal for identifying each of said channels;

C. means provided by said video source for generating a vertical sync signal;

D. a multiplexing system including a timing circuit and a coding circuit for said video signals of each of said channels;

E. said timing circuit including;

1. means activated by said vertical sync signal for generating code synchronization pulses, and
2. means for generating shifting pulses synchronized with said code synchronization pulses, F. said coding circuit including;

1. a code generator for generating a digital code identifying a particular channel, and
2. a shift register coupled to said code generator, G. means for coupling said channel signal to said code generator for causing said digital code to be shifted into said shift register;

H. a multiplexing circuit;

I. means for supplying said video signals to said multiplexing circuit; and

J. means for supplying said code synchronization pulses and said digital code to said multiplexing circuit for insertion in said video signal;

whereby said video signals generated by said video source have identifying digital coded signals and code synchronization pulses inserted therein.

2. The system as set forth in claim 1, wherein said timing circuit includes:

A. a pulse generating clock for generating a first and second chain of pulses with said second chain of pulses having a frequency greater than said first chain of pulses and said first chain of pulses having a frequency equal to the horizontal sync frequency of said video signal;

B. means for activating said pulse generating clock with said vertical sync signal; and C. means activated by said first and second chain of pulses for generating said code synchronization pulses for insertion in said video signal after a predetermined number of horizontal sync pulses have elapsed.

3. The system as set forth in claim 1, wherein said timing circuit includes:

A. a control flip-flop; and

B. means for shifting said digital code out of said shift register after said synchronization pulses have been inserted in said video signal.

4. The system as set forth in claim 1, wherein said means for supplying said video signal to said multiplexing circuit includes:

A. a video switch having an input and an output;

B. means for coupling said video signal to said input of said video switch;

C. means for coupling said output of said video switch to said multiplexing circuit, and D. means activated by said channel signal for enabling said video switch for passing said video signal to said multiplexing circuit.

5. The system set forth in claim 1, further comprising a demultiplexing system which includes:

A. means for receiving said video signal with said digital coded signals and code synchronization pulses inserted therein;

B. a plurality of recording means for recording said video signal;

C. a shift register;

D. means for removing said digital coded signals from said received video signal;

E. means for removing said code synchronization pulses from said received video signal and utilizing said code synchronization pulses for shifting said digital coded signals into said shift register, and F. a decoder coupled between said shift register and said plurality of recording means for causing said received video signal to be recorded on a particular recording means determined by the digital coded signals in said shift register.

6. The system set forth in claim 5 wherein:

A. said plurality of recording means are disc recorders, one of said disc recorders being assigned to record video signals from a respective channel of said video source.

* * * * *